United States Patent Office 3,078,318
Patented Feb. 19, 1963

3,078,318
PRODUCTION OF SPECIFIC XYLENE ISOMERS
Charles V. Berger, Western Springs, Ill., assignor, by mesne assignments, to Universal Oil Products Company, Des Plaines, Ill., a corporation of Delaware
No Drawing. Filed July 5, 1957, Ser. No. 669,917
15 Claims. (Cl. 260—668)

This application is a continuation-in-part of my co-pending application Serial Number 253,443, filed October 26, 1951, now abandoned.

This invention relates to a process for the production and recovery of a particular xylene isomer from a hydrocarbon mixture, utilizing a flow arrangement wherein substantially all of the various xylene isomers contained in the hydrocarbon fraction may be converted to the particular xylene isomer desired. More specifically, the invention concerns a process comprising a combination of steps, including: an isomerization stage wherein the hydrocarbon feed stock is subjected to the action of a particular isomerization catalyst at isomerizing reaction conditions, a separation stage wherein the particular xylene isomer desired is recovered from the isomerization reaction product and a recycling operation wherein the remaining xylene isomers are returned to the isomerization stage.

It has heretofore been observed that hydrocarbon fractions containing the various xylene isomers, when subjected to isomerizing conditions for a sufficient period of time contain the xylene isomers in a substantially uniform ratio of ortho-, para-, and meta-xylenes to ethylbenzene, referred to a "an equilibrium" mixture, generally containing the isomers in the approximate proportion of about 50% by weight of meta-xylene, about 20% by weight each of ortho-, and para-xylenes, and about 10% by weight of ethylbenzene, the particular equilibrium proportions depending upon the isomerization temperature, etc. Although for many uses, the equilibrium mixture of the various $C_8$ aromatic hydrocarbon isomers is suitable for a given purpose, for other uses, on the other hand, one of the xylene isomers in a high state of purity is particularly desired for the production of a specific derivative thereof, as for example, the production of phthalic acid by oxidizing ortho-xylene, in which process only the ortho-isomer will produce the desired 1,2-benzene dicarboxylic acid. It, therefore, becomes desirable in many instances to separate the particular xylene isomer from an equilibrium mixture of the $C_8$ aromatics derived from a natural source or produced as a by-product of another process. It has now been discovered that after removal of the particular isomer from a mixture of $C_8$ aromatic hydrocarbons, either the separated component or the remaining isomeric components in the mixture may be subjected to isomerization in the presence of a particular catalyst comprising platinum or palladium supported on alumina and hydrogen to regenerate the mixture of $C_8$ aromatic hydrocarbon isomers which approaches the equilibrium proportion of ortho-, meta-, and para-xylenes and ethyl-benzene. The resulting mixture may then be recycled to the separation stage for the recovery of one or more of the above indicated isomers therefrom. It is, of course, evident that the $C_8$ aromatic hydrocarbon isomers remaining in the mixture after the separation therefrom of the particular isomer desired may be repeatedly recycled to the isomerization stage and the resulting isomeric mixture again subjected to separation until the content of $C_8$ aromatic components in the initial mixture is depreciated substantially to depletion.

One object of the invention, therefore, is to provide a process for converting a mixture of $C_8$ aromatic hydrocarbon isomers to a particular isomer in a substantially quantitative yield thereof.

Another object of the invention is to provide a process for converting a $C_8$ aromatic hydrocarbon isomer to another isomeric $C_8$ aromatic hydrocarbon or to a mixture of said isomers.

In one of its embodiments the present invention relates to a process for the selective production of a particular xylene isomer which comprises subjecting a hydrocarbon fraction containing a $C_8$ aromatic isomer to isomerizing conditions in the presence of hydrogen and a catalyst comprising a catalytic metal selected from the group consisting of platinum and palladium supported on alumina, thereafter separating said particular xylene isomer from the resulting mixture of $C_8$ aromatic hydrocarbon isomers and recycling the remaining, $C_8$ aromatic hydrocarbon-containing fraction to the isomerizing reaction.

A more specific embodiment of the invention concerns a process for the selective production of ortho-xylene which comprises subjecting a $C_8$ aromatic hydrocarbon-containing hydrocarbon fraction containing less of the ortho-isomer than an equilibrium mixture of $C_8$ aromatic hydrocarbon isomers to isomerizing conditions in the presence of hydrogen and in the presence of a catalyst consisting essentially of platinum, alumina, and a halogen selected from the group consisting of fluorine and chlorine to thereby form said equilibrium mixture, thereafter separating ortho-xylene from the resulting mixture of xylene isomers and recycling the remaining hydrocarbon fraction to the isomerizing reaction.

Charging stocks which may be utilized in the present combination process include generally certain hydrocarbon fractions containing at least one of the $C_8$ aromatic hydrocarbon isomers where the object of the invention is to produce one of the other isomers exclusively therefrom, as for example, when the latter is desired for a particular purpose in which the other isomers are not suitable. The charging stock may thus be a single $C_8$ aromatic hydrocarbon, such as one of the group consisting of ortho-, meta-, or para-xylene or ethylbenzene, or a mixture of the aforesaid $C_8$ aromatic hydrocarbons in which the ratio of isomers is other than the equilibrium proportion of $C_8$ aromatic components, said mixture being either exclusively $C_8$ aromatic components or these may be accompanied by other classes of hydrocarbon, such as paraffins, other aromatic hydrocarbons, olefins, naphthenes, etc., or a mixture of hydrocarbons including at least one of the aforesaid xylene isomers with other compounds inert in the present process. One of the preferred sources of the present charging stock is a fraction derived from certain petroleum conversion products containing aromatic hydrocarbons and including fractions boiling within the range of from about 120° to about 145° C. Suitable fractions utilizable in the present process may be separated from gasoline produced by subjecting an appropriately boiling petroleum fraction to dehydrogenation as, for example, a hydroformed gasoline boiling range fraction containing naphthenic hydrocarbons. Such gasoline boiling range fractions of petroleum conversion products may be produced either thermally (that is, in the absence of any recognized catalytic agent) and/or produced in a catalyzed cracking, reforming, or hydroforming reaction in accordance with procedures well known in the art. It is to be emphasized that although other hydrocarbon classes may be present in the mixture of hydrocarbons subjected to the present process, it is preferred that the mixture contain no substantial proportion of polymerizable or condensable hydrocarbons. The feed stocks most readily adapted to the present process conditions comprise merely one or more of the xylene isomers in admixture with paraffinic and/or naphthenic hydrocarbons, the latter saturated hydrocarbons undergoing dehydro-isomerization and dehydrocyclization reactions during their contact with the present catalyst at the operating conditions provided herein to produce an in situ supply of hydrogen as well as additional aromatic hydrocarbon products. Although a hydrocarbon fraction of relatively wide boiling range may be used as charging stock in the process, the isomerization and separation stages proceed to completion most readily when utilizing a relatively narrow boiling range cut containing the present isomers, such as a fraction boiling from about 120° to about 145° C., said range covering the known $C_8$ aromatic hydrocarbons as well as the known azeotropes thereof with other classes of hydrocarbons.

The isomerization stage of the present process, which may precede or follow the separation stage, is effected in the presence of a particular catalytic agent comprising a composite of a metal selected from the group consisting of a platinum and palladium supported on alumina. The isomerization stage involves a reaction which directs the conversion of a particular $C_8$ aromatic hydrocarbon isomer or mixture of isomers toward the equilibrium mixture of said isomers, different from the mixture employed as charge stock, the product of the reaction containing a certain proportion of the various isomers, depending upon the temperature at which the isomerization reaction is effected. The relationship of temperature with the composition of the $C_8$ aromatic fraction at equilibrium conditions is shown in the following Table I (obtained from API free energy data).

TABLE I

|  | Composition of $C_8$ aromatics | | | | | |
|---|---|---|---|---|---|---|
| Temperature, ° K. (i.e. ° C.+ 273°) | 300 | 400 | 500 | 600 | 700 | 800 |
| Mole Percent of Isomer: | | | | | | |
| Ethylbenzene | 1 | 2 | 4 | 6 | 8 | 11 |
| Ortho-Xylene | 16 | 19 | 21 | 22 | 22 | 23 |
| Meta-Xylene | 59 | 55 | 52 | 50 | 48 | 45 |
| Para-Xylene | 24 | 24 | 23 | 22 | 22 | 21 |

It is thus evident that the isomerization may be effected with any particular isomer or mixture of isomers and that any suitable isomerization temperature may be employed in the isomerization reaction to obtain a product containing the most favorable proportion of the particular isomer desired as the ultimate product. The catalyst utilized in the present process for the isomerization reaction stage is a composite which has been found to be particularly effective in rapidly converting the mixture of $C_8$ aromatic hydrocarbons to the particular equilibrium composition most favorable or desirable in the separation stage of the process. The catalyst is customarily prepared by depositing platinum and/or palladium on the surface of or in the body of a mass of alumina particles; one of the preferred catalyst compositions for the isomerization reaction comprises a composite of platinum, alumina and a halogen combined with the metallic components, preferably chlorine or fluorine or a combination of the latter two; bromine and iodine may also be utilized as the combined halogen component of the isomerizing catalyst, although not necessarily with results equivalent to the results obtained from the use of chlorine and/or fluorine as the halogen components. Methods of preparing such catalysts are well known in the art, but briefly the catalyst may be prepared by adding an aqueous solution of a platinum salt, such as platinous chloride to a previously prepared alumina sol, such as aluminum hydroxide, precipitated from an aqueous aluminum halide salt solution, as for example, by the addition of ammonium hydroxide or hexamethylenetetramine thereto. One of the preferred supports for the platinum and/or palladium is an alumina containing a small amount of aluminum chloride, aluminum fluoride and/or their oxychloride or oxyfluoride derivatives which may be formed by adding an aqueous solution of an alkaline material, preferably ammonium hydroxide, to an aqueous solution of aluminum chloride or aluminum fluoride, in an amount sufficient only to precipitate the aluminum oxyfluoride or oxychloride. The platinum and/or palladium are thereafter precipitated on the support from the corresponding halide salts utilized to impregnate the support, thereby forming a composite of platinum and/or palladium on the alumina. Calcination of the resulting composite in a reducing atmosphere produces the final catalyst comprising platinum and/or palladium supported on an oxide comprising alumina which may, in addition, contain a small amount of combined halogen. Suitably effective catalysts for the present process generally contain not more than about 1.0% by weight of platinum and/or palladium, although composites containing as little as from about 0.01 to about 0.1% platinum and/or palladium are effective catalysts, particularly when composited with an alumina containing from about 0.1 to about 8% by weight of combined fluorine and/or chlorine. The latter halides are generally considered to be present in the composite as the corresponding fluoride and/or chloride ions.

The isomerization of a $C_8$ aromatic hydrocarbon charging stock is effected with the present catalyst at a temperature of from about 700° to about 1100° F., preferably at from about 750° to about 1000° F., at a pressure of from about atmospheric to about 1500 pounds per square inch (preferably at a pressure of from about 100 to about 700 pounds per square inch), at a weight hourly space velocity of from about 0.5 to about 10 and more preferably at from about 1 to about 5 weight proportions of hydrocarbon per hour per unit weight of catalyst and in the presence of from about 0.1 to about 10 (more preferably, from about 1.5 to about 5) moles of hydrogen per mole of hydrocarbon charge stock. The particular temperature, pressure and space velocity to be used in any given operation, however, will depend upon the particular mixture of compounds in the feed stock and the particular $C_8$ isomer desired as product. No combination of high pressures with low temperatures within the above ranges should be used, however, which will effect hydrogenation of the xylene isomers to naphthenes as the ultimate products of the process.

The presence of hydrogen in the isomerization zone in contact with the catalyst and feed stock accomplishes the desired isomerization and cyclization reactions which result in the shift of the $C_8$ aromatic composition toward the equilibrium mixture. The hydrogen supplied to the reaction zone for this purpose may be derived from free hydrogen specifically introduced from external sources into the reactor; alternatively, the hydrogen may be supplied from in situ sources, such as hydrogen formed by the dehydrogenation reactions which occur as a result of the process. Thus, paraffins and naphthenes which may accompany the $C_8$ aromatics in the feed stock fraction undergo dehydrogenation and supply an in situ source of hydrogen, although at least a portion of the hydrogen present in the reaction zone is preferably continuously introduced into the reactor from extraneous or recycle sources and another portion continuously withdrawn to thereby remove sulfur and nitrogen impurities generally found in petroleum-derived charge stocks.

A particularly suitable type of reactor for effecting the contact of the charging stock with the catalyst particles in the isomerization stage of the process is the well known fixed bed contacting system in which the catalyst is disposed in a reaction zone as a fixed bed and the hydrocarbons to be isomerized are passed through the bed in either upward or downward flow. The products may be fractionated to separate normally gaseous from normally liquid products and to recover a fraction from which the desired xylene isomer is to be recovered in the separation stage of the present process. Other suitable means for effecting contact of the feed stock with the isomerization catalyst include various moving bed type of flow, such as the fluidized type of operation. As previously indicated, the products of the isomerization reaction are preferably fractionated to recover a more select fraction for diversion into the separation stage of the process, preferably, a fraction boiling from about 120° to about 150° C.

The separation of the $C_8$ aromatic hydrocarbon isomers to recover the component thereof particularly desired for a specific purpose may be accomplished by any suitable means, several procedures therefor being well known in the prior art. Thus, for example, ortho-xylene (having a boiling point of 144° C. at 760 mm. pressure), if desired at the selective xylene isomer to be recovered, may be separated from its other isomers; meta-xylene (having a boiling point of 138.8° C. at 760 mm. pressure), para-xylene (B.P., 138° C. at 760 mm.) and ethylbenzene (B.P. 136.2° C. at 760 mm.) by fractional distillation in an efficient fractionating column, as for example, in a column containing an equivalent of at least 30 theoretical plates and utilizing a reflux ratio of at least 10 to 1. The remaining mixture of xylenes may then be subjected to isomerization in accordance with the process of the present invention, producing an equilibrium mixture containing the previously indicated proportions of xylene isomers. The latter equilibrium mixture may thereafter be again subjected to the indicated fractional distillation to separate and recover an additional quantity of the desired ortho-xylene isomer. The alternate isomerization and separation stages may be repeated until depletion of the $C_8$ fraction and complete conversion to the desired isomer. Where the object of the separation is to recover meta-xylene from the hydrocarbon fraction containing the other xylene isomers or from a select fraction comprising a constant boiling mixture of meta- and para-xylenes, numerous methods are known in the art for effecting such separation. One process for the recovery of meta-xylene from the other xylene isomers comprises contacting the xylene mixture with liquid hydrogen fluoride or a solution of boron trifluoride in liquid hydrogen fluoride at a temperature not greater than about 100° F. and separating an extract phase containing the HF—$BF_3$ extractant and a greater proportion of meta-xylene than is present in the hydrocarbon mixture subjected to extraction. Another method of separating para- and meta-xylenes involves sulfonating the hydrocarbon mixture, extraction of the resulting sulfonation reaction mixture to separate a xylene sulfonate from non-sulfonated hydrocarbons, followed by steam distillation of the meta-isomer from the extract. Still another method of separation involves subjecting the hydrocarbon mixture to alkylation, separating the resulting alkylates by fractional distillation, thereafter subjecting the alkylates to dealkylation and recovering the individual isomers from the dealkylation reaction product. Other methods of separation involving both physical and chemical processes may be utilized, as, for example, by crystallization of the para-isomer from a mixture thereof with the other $C_8$ aromatics at temperatures below about −50° C.; these are well known separation procedures and need not be specifically described here.

The present invention is further illustrated with respect to several of its specific embodiments in the following examples, which, however, are not intended to limit the generally broad scope of the invention in strict accordance therewith.

*Example I*

A fraction boiling from about 125° to about 140° C. (thereby excluding substantially all $C_7$ and $C_9$ aromatic hydrocarbons, which individually or in the presence of other hydrocarbons capable of azeotroping therewith boil above or below the aforementioned temperature range) is separated by fractional distillation from the products of a thermal reforming reaction wherein a gasoline boiling range fraction containing naphthenic hydrocarbons is subjected to thermal reforming at temperatures of from about 840° to about 950° F. in the presence of hydrogen. The 125°–140° C. fraction thus separated contains approximately 38% by weight of $C_8$ aromatic hydrocarbons of which approximately 50% by weight is meta-xylene, approximately 20% of which is ortho-xylene, approximately 20% by weight thereof is para-xylene and the remaining approximate 10% is ethylbenzene.

The mixture of hydrocarbons thus separated is charged into a fractional distillation column having 36 theoretical plates and distilled under a reflux ratio of 15 to 1 to remove overhead the components of the mixture boiling below ortho-xylene (boiling point 144° C. at standard pressure), leaving ortho-xylene as a bottom fraction in the column. Approximately 95% of the ortho-xylene contained in the initial hydrocarbon fraction boiling from 125° to 140° C. is thereby recovered.

The overhead fraction comprising predominantly meta-xylene, para-xylene and ethylbenzene in admixture with paraffinic and naphthenic hydrocarbons is passed through a tubular reactor containing a fixed bed of a reforming catalyst comprising a composite of 0.18% platinum deposited on alumina, the composite particles being maintained in the reactor as a fixed bed. In effecting the isomerization reaction, the fraction containing the meta- and para-xylenes and ethyl-benzene is heated to a temperature of about 470° C. and passed at a pressure of 500 pounds per square inch and at a liquid hourly space velocity of 2 downwardly over the fixed bed of catalyst, the products of the reaction thereafter being cooled to condense the normally liquid components thereof in a receiver vessel. The liquid fraction resulting from the conversion is analyzed for its content of various xylene isomers and ethylbenzene, and is found to contain approximately 21% $C_8$ aromatic hydrocarbons of which approximately 50 weight per cent is meta-xylene, 20% by weight is ortho-xylene, 20% by weight is para-xylene and approximately 10% by weight is ethylbenzene. The resulting mixture is again subjected to fractional distillation in the column indicated above to recover a fraction boiling about 144°+0.5° C. at normal pressure and comprising approximately 95% by weight of the ortho-xylene contained in the hydrocarbon fraction subjected to distillation.

*Example II*

The fraction boiling from about 120° to about 145° C. of a catalytically reformed petroleum fraction was separated from the normally liquid products of a reforming conversion process as the charging stock utilized in the following example. The 120–145° C. fraction contains 76% by weight of $C_8$ aromatic hydrocarbons and 24% by weight of a mixture of paraffins, olefins, and naphthenes containing from 7 to 8 carbon atoms per molecule. Upon infra-red and spectroscopic analysis of the 120–145° C. fraction, it is found to contain approximately 38% by weight of meta-xylene, 15.2% by weight of ortho-xylene, approximately 15.2% by weight of para-xylene, and 7.6% by weight of ethylbenzene. The fraction is thereafter charged into a pressure autoclave with a mixture of hydrogen fluoride and boron trifluoride containing 31% by weight of boron trifluoride, utilizing a ratio of hydrocarbons to extractant of from about 1.5 to 1. The mixture in the autoclave is thereafter heated to a temperature of 35° C. and pressured to 310 pounds per square inch with compressed nitrogen. After stirring for five minutes, the contents of the autoclave are chilled to 0° C. and thereafter emptied into a copper settling vessel to permit the separation of a liquid extract phase from a resulting raffinate phase. The extract comprises about 73% by volume of the total combined raffinate and extract and contains approximately 4.2 weight percent meta-xylene, 15.3% ortho-xylene, 20.8% para-xylene, 16.7% ethylbenzene and 43.2% non-aromatic hydrocarbons. Analysis of the hydrocarbon material recovered from the extract fraction indicates that it contains about 65.6 weight percent of meta-xylene, 15.3% ortho-xylene, 10.6% para-xylene, 0% ethylbenzene and 8.6% non-aromatic hydrocarbons.

The raffinate separated as indicated above is charged at isomerizing reaction conditions through a fixed bed catalytic reactor containing a catalyst comprising alumina impregnated with approximately 0.21% platinum, 0.25% fluorine, and 0.15% chlorine. Isomerization of the above raffinate phase is effected by heating the mixture of hydrocarbons to a temperature of about 460° C. and passing the mixture of hydrocarbons through the fixed bed catalytic reactor at a liquid hourly space velocity of 1.7 and at a pressure of 125 pounds per square inch gauge. The products of the isomerization reaction are condensed in a water-cooled condenser to separate normally liquid products from normally gaseous materials. The product contains approximately 50% by weight of meta-xylene, 20% by weight each of ortho- and para-xylene, and 10% by weight of ethylbenzene and may be recycled to the separation step described as the first stage of the process.

*Example III*

A commercial grade of mixed xylenes (Phillips Petroleum Company xylene mixture boiling from 137° to 140° C.) containing (by ultra-violet spectrographic analysis): 28% by weight para-xylene, 62% meta-xylene, 6% ortho-xylene and 4% ethylbenzene was charged into a catalytic reforming reactor comprising a vertical pipe containing a feed stock preheating section and a catalytic reforming zone. The latter reaction zone contains 50 cc. of reforming catalyst consisting of about 0.3% platinum and about 0.4% of combined fluorine and chlorine deposited on alumina. The feed stock is charged, together with hydrogen in sufficient quantity to provide a hydrogen to hydrocarbon molar ratio in the reforming zone of 3 to 1, the hydrocarbon being introduced at a rate sufficient to provide a liquid hourly space velocity (i.e. volume of liquid hydrocarbon feed per volume of catalyst per hour) through the catalyst of 2.0. The preheater and the catalyst was maintained at a temperature of approximately 470° C., thereby heating the charge streams in the presence of the hydrogen prior to contact with the catalyst at the isomerizing conditions. The feed was charged into the unit at a pressure of 500 lbs./in.² in one run and at 300 lbs./in.² in another run. The reactor effluent (withdrawn from the bottom of the reactor) was cooled in order to separate a normally liquid product from a gaseous fraction comprising mostly hydrogen. The liquid fraction was analyzed for its xylene content by ultra-violet analysis in order to determine the effectiveness of the catalyst in isomerizing the mixture of xylene isomers. The following Table I presents the data concerning the results of the above runs:

TABLE I

[Isomerization of $C_8$ aromatic fraction to produce an equilibrium mixture]

| Run No | 1 | 2 | Charge stock |
|---|---|---|---|
| Pressure, p.s.i.g | 500 | 300 | |
| Temperature, ° C. of catalyst | 470 | 470 | |
| Non-aromatics in product, wt. percent of charge | 12 | 4 | 2 |
| Aromatic product, wt. percent of charge | 86 | 94 | 98 |
| Composition of $C_8$ cut: | | | |
| p-Xylene | 30 | 26 | 28 |
| m-Xylene | 36 | 54 | 62 |
| o-Xylene | 20 | 16 | 6 |
| Ethylbenzene | 14 | 4 | 4 |

Para-xylene in substantially pure form is separated from the mixture of xylene isomers prepared in Run No. 2, above, by crystallization of the para-xylene isomer from the mixture and centrifuging the resulting slurry to segregate the desired p-xylene component. The above $C_8$ aromatic mixture is cooled to approximately −60° C. to form a thick slurry which is discharged into a perforated basket revolving on its vertical axis at about 5000 r.p.m. A mother liquor, comprising the uncrystallized isomers of p-xylene is separately collected and recycled to the isomerization reactor as a portion of the charge stock thereto. Its composition is as follows:

Percent by weight
p-Xylene _____ 8
m-Xylene _____ 67.5
o-Xylene _____ 19.5
Ethylbenzene _____ 5

The mass of crystallized p-xylene, wet with mother liquor, is charged into a countercurrent press which gradually increases the temperature of the mass as the latter flows downwardly through the press, the expressed residual liquor flowing upwardly, through an outlet just below the point of entry of the centrifuged mass of crystals. The thus expressed liquid residue is composed predominantly of p-xylene but also contains the residue of xylene isomers incompletely removed by centrifugation. The liquid expressed from the wet mass of crystals is recycled to the inlet of the crystallization chamber for recovery of the p-xylene therefrom.

The expressed crystals removed from the bottom of the press is 99+% p-xylene in a yield of 18.3% by weight of the feed to the crystallization unit.

I claim as my invention:

1. A process for the selective production of a particular xylene isomer which comprises subjecting a $C_8$ aromatic hydrocarbon fraction to isomerization in the presence of a catalyst comprising platinum supported on alumina, and thereafter separating said particular xylene isomer from the resulting hydrocarbon mixture.

2. A process for the selective production of a specific xylene isomer which comprises subjecting a $C_8$ aromatic hydrocarbon-containing fraction of a particular equilibrium composition to separation, recovering a fraction richer in said specific xylene isomer than the $C_8$ aromatic hydrocarbon fraction subjected to said separation from a raffinate fraction relatively poorer in said specific xylene isomer, subjecting said raffinate fraction to isomerization in the presence of a catalyst comprising platinum supported on alumina and recycling the product of said isomerization reaction to said separation.

3. The process of claim 1 further characterized in that said $C_8$ aromatic hydrocarbon-containing fraction is a hydrocarbon distillate boiling from about 120° to about 145° C.

4. A process for converting a particular xylene isomer to another specific isomer thereof which comprises subjecting said particular xylene isomer to isomerization in the presence of a catalyst consisting of platinum supported on alumina containing a combined halide selected from the group consisting of fluoride and chloride, thereafter separating said specific xylene isomer from the resulting mixture of $C_8$ aromatic hydrocarbons and recycling the remaining hydrocarbon to the isomerizing reaction.

5. The process of claim 1 further characterized in that said catalyst contains from about 0.01 to about 1.0% by weight of platinum.

6. The process of claim 4 further characterized in that said catalyst contains from about 0.1 to about 8% by weight of halogen selected from the group consisting of chlorine and fluorine.

7. The process of claim 1 further characterized in that said isomerizing reaction is effected at a temperature of from about 750° to about 1100° F., at a pressure of from about 100 to about 500 pounds per square inch and at a weight hourly space velocity of from about 1.0 to about 5.

8. The process of claim 1 further characterized in that said isomerization is effected in the presence of free hydrogen.

9. The process of claim 8 further characterized in that from about 0.1 to about 10 moles of hydrogen per mole of hydrocarbon is supplied to the reaction zone.

10. A process for the selective production of ortho-xylene which comprises subjecting a $C_8$ aromatic hydrocarbon-containing fraction to isomerization in the presence of a catalyst consisting essentially of platinum, alumina and a halogen selected from the group consisting of fluorine and chlorine, thereafter separating ortho-xylene from the resulting mixture of xylene isomers and recycling the remaining hydrocarbon fraction to said isomerizing reaction.

11. The process of claim 10 further characterized in that from about 0.1 to about 10 moles of free hydrogen per mole of hydrocarbon is supplied to the reaction.

12. The process of claim 4 further characterized in that said isomerization is effected in the presence of a saturated hydrocarbon selected from the group consisting of the aliphatic and cyclic paraffinic hydrocarbons.

13. The process of claim 1 further characterized in that said $C_8$ aromatic hydrocarbon fraction is a reformed gasoline fraction boiling in the range of from about 120° C. to about 145° C.

14. The process of claim 2 further characterized in that said $C_8$ aromatic hydrocarbon fraction is a reformed gasoline fraction boiling in the range of from about 120° C. to about 145° C.

15. The process of claim 10 further characterized in that said $C_8$ aromatic hydrocarbon fraction is a reformed gasoline fraction boiling in the range of from about 120° C. to about 145° C.

References Cited in the file of this patent
UNITED STATES PATENTS

| | | |
|---|---|---|
| 2,403,757 | Reeves | July 19, 1946 |
| 2,479,110 | Haensel | Aug. 16, 1949 |
| 2,532,276 | Birch et al. | Dec. 5, 1950 |
| 2,630,404 | Berger | Mar. 3, 1953 |
| 2,656,397 | Holzman | Oct. 20, 1953 |
| 2,723,947 | Oblad et al. | Nov. 15, 1955 |
| 2,743,215 | Riblett et al. | Apr. 24, 1956 |
| 2,746,937 | Hunter et al. | May 22, 1956 |
| 2,760,912 | Schwarzenbek | Aug. 28, 1956 |
| 2,784,241 | Holm | Mar. 5, 1957 |

OTHER REFERENCES

Sachanen: "Chemical Constituents of Petroleum" (1945), page 214, Reinhold Publishing Corp., N.Y.

Komarewsky et al.: "Oil and Gas Journal," June 24, 1943, pages 90–93.